Patented Oct. 12, 1943

2,331,574

UNITED STATES PATENT OFFICE 2,331,574

PROCESS OF RECOVERING BILIRUBIN

Robert H. Sifferd, Jules D. Porsche, and Fred J. Solms, Chicago, Ill., assignors to Armour and Company, Chicago, Ill. a corporation of Illinois No Drawing. Application June 1, 1940, Serial No. 338,434

9 Claims. (Cl. 260—314)

This invention relates to processes for recovering bilirubin from impure mixtures containing it and more particularly to processes for recovering bilirubin from solutions of bilirubin and impurities in water immiscible organic solvents.

Crude bilirubin or impure bilirubin solutions may be recovered in various ways from bile, gall stones and other materials which contain bilirubin. The pigment is pressed in nature in said materials in the form of a complex or complexes, probably bound in a complex with protein and it is the practice to break this complex and recover bilirubin from the resulting mixture. Bile, for example, may be allowed to putrefy to liberate the bilirubin from the said complexes, after which the putrefied mass is extracted with a suitable solvent to obtain a solution containing bilirubin admixed with other substances such as bile acids, other bile pigments, fats, sterols, and the like. Bile, gall stones and the like may, on the other hand, be treated at an elevated temperature, with added water if necessary, as described in the copending application of Porsche et al., Serial No. 338,432, filed June 1, 1940. After this heating step, or simultaneously with it, the solution is treated with a suitable water-immiscible solvent to extract the liberated bile pigments. In still another process, the bilirubin is precipitated from bile for example, by adding to the natural complex alkaline earth hydroxides or oxides, and the precipitate is then acidified and extracted with a solvent capable of dissolving bilirubin.

In all of these processes, a crude bilirubin product is obtained which contains admixtures of bile acids, sterols, fats, and pigments other than bilirubin which are usually acidic in character and it is necessary to fractionate further. In some instances, the solvent extract is concentrated until crystallization occurs and the crystalline bilirubin residue is washed with solvents which will remove the lipoid or acidic impurities occurring therewith. Losses of bilirubin are unduly high, however, and it appears that the solubility of the bilirubin in the solvents used to wash these residues is increased by the acidic impurities present. The extract containing the crude bilirubin may be evaporated to dryness and the entire residue washed, but the losses are high in this case also. The residues obtained in any manner may be taken up in a suitable solvent and the bilirubin allowed to crystallize therefrom. These methods are wasteful and inefficient in producing highly purified bilirubin.

We have now discovered a method by which bilirubin can be recovered from crude, or impure, mixtures containing the same by subjecting such a crude bilirubin mixture, dissolved in a suitable solvent, to the action of a weakly basic substance to remove strongly acidic impurities, and subjecting the remaining bilirubin-containing mixture to the action of a more strongly basic substance to recover the bilirubin in the form of its salt. The bilirubin salt is then dissolved in water or alcohol and acidified to free the bilirubin from its salt.

The impurities to which we refer include the bile pigments other than bilirubin such as biliverdine. The bile acids may not in fact be present during the treatment with the weakly basic substance and may be already excluded by reason of the solvent used in the prior extraction step.

A purified bilirubin can be recovered from mixtures containing impurities by dissolving the said impure mixtures in a suitable water-immiscible solvent and adding thereto a weakly basic substance such as sodium bicarbonate, sodium acetate, dipotassium phosphate and the like. The substance is suitably added as a moist solid, such as a powder moistened with a small amount of water. Alternatively, where the crude bilirubin solution does not contain large amounts of acidic impurities which are emulsifying agents, other strong acids may be removed by adding a weakly basic substance such as described above, in the form of its aqueous solution. In either case, the weakly basic medium is thoroughly mixed with the crude solution and the bilirubin-containing solution is then recovered.

This solution, which contains bilirubin and also fats, sterols and such residual impurities dissolved in a water-immiscible organic solvent, is then subjected to the action of a stronger base such as potassium carbonate, sodium carbonate, sodium hydroxide and the like. This base may be added as a slurry or as a solid which has been moistened with a small amount of water. Alternatively, it may be added as an aqueous solution, but we prefer to add it in the form of a moist powder. Preferably, somewhat of an excess of such base is added over that calculated to be necessary to form a salt with the bilirubin present. The bilirubin salt precipitates and is separated from the solution in any convenient manner.

Our process gives high yields of a bilirubin which is quite free of contaminating material. By first removing the strongly acidic impurities, we avoid the excessive losses occasioned by said impurities in the prior art. We have observed that methods of separating bilirubin from accompanying impurities in which the said impurities are washed away from the bilirubin by preferential solvents are not satisfactory because the bilirubin itself, while normally insoluble in said solvents, is increasingly soluble in such solvents in the presence of the strongly acidic impurities referred to above. To avoid these losses we remove the acidic impurities by reaction with weakly basic substances and then recover bilirubin in the form of its salt, from which salt the bilirubin is then liberated.

The following is a specific example of the manner of carrying out our process:

Example 50 gallons of hog bile adjusted to a pH of about 9.0 with a solution of sodium hydroxide are boiled for about an hour. At the end of this time the solution is acidified with acetic acid to a pH of about 6.1 and extracted with 50 gallons of chlorbenzene.

The chlorbenzene extract so obtained is cooled to room temperature and there are added to it 5.5 ounces glacial acetic acid, and then, with vigorous stirring, 10 lbs. of sodium bicarbonate moistened with about 0.6 quart of water. The whole is well stirred for about one-half hour and allowed to settle, whereupon the chlorbenzene layer is separated off, conveniently by drawing off without filtering. To the separated chlorbenzene solution is then added a freshly-made slurry containing 0.65 lb. of sodium carbonate and one pint of water and the mixture is stirred vigorously for one-half hour. The mixture is then filtered and the precipitated sodium bilirubinate recovered. It is dissolved in alcohol and the alcohol solution is filtered, if necessary, to remove any excess sodium carbonate. The sodium carbonate is carefully washed with alcohol to recover any adhering sodium bilirubinate. To the combined alcohol solution and washings is then added, with stirring, enough acetic acid to produce a turbidity and then a slight excess (about 5 cc.). The mixture is allowed to stand until the precipitate has well settled and the precipitate, which is the desired bilirubin, is then collected, suitably by filtration, and washed with alcohol and water, and finally with ether. A yield of 30 grams of bilirubin is obtained.

The chlorbenzene extract recovered from the bile as shown in the example need not be further processed immediately but may be stored until needed. It is generally preferable to store it out of contact with light and in a cool place.

The product obtained by a process as described in U. S. 2,166,073, for example, in which a bilirubin-containing material is treated with calcium hydroxide to precipitate calcium salts of bilirubin and bile acids may also be treated by the process of our invention. The precipitate so obtained is suspended in a liquid chlorinated hydrocarbon and acid is added to liberate the bilirubin from its salt. When acidification is carefully carried out so that only small amounts of bile acids are liberated at the same time, the solution obtained with the chlorinated hydrocarbon solvent is then treated with an aqueous solution of weakly basic substance such as sodium bicarbonate, dipotassium phosphate and the like, and the chlorinated hydrocarbon phase may then be separated off and treated with a solution of a stronger base such as caustic soda and the like to form the corresponding bilirubin salt. This salt is then separated off in the aqueous phase and bilirubin obtained therefrom by acidification and recovery of the precipitated bilirubin, which may then be further washed as described above. The amounts of weakly basic and strongly basic substances to be added will depend upon the concentrations of strongly acidic impurities and of bilirubin in the solutions to be treated, and, with the calcium salts described above, quite small amounts of weakly basic substances will be required. In the case of ox bile, for example, the amount of bilirubin present in the bile is ordinarily much less than that present in hog bile and the solvent extract obtained therefrom is somewhat less concentrated so that a corresponding smaller amount of sodium carbonate or caustic soda is required to form the salt.

As water-immiscible solvents in preparing the bilirubin solutions we can use for example carbon disulfide, dimethylaniline, chlorinated hydrocarbons, etc. In general, we prefer to use the liquid chlorinated aromatic hydrocarbons because of their cheapness, availability, high specific gravity and high dissolving power for bilirubin. Any suitable acid may be used to free the bilirubin from its salt, for example, acetic acid, hydrochloric acid, and the like.

Our process prevents losses of bilirubin usual in extracting contaminating acidic substances such as bile acids away from bilirubin in crude bilirubin mixtures. The product which we prepare is obtained in high yield and is of extremely high purity. The examples given above are by way of illustration only and no unnecessary limitations are to be understood therefrom. It will be understood that variations may be made therein without departing from the spirit of this invention.

Having now described our invention, what we wish to claim is:

1. A process for recovering bilirubin from natural complexes containing the same which comprises liberating the bilirubin therefrom, extracting the bilirubin from the resulting mixture with a liquid chlorinated hydrocarbon solvent, subjecting said solvent to the action of a moist, solid weakly basic substance to remove strongly acidic compounds, separating the hydrocarbon solvent phase, subjecting said phase to the action of a moist, solid stronger base to precipitate bilirubin salt, separating said precipitated salt and acidifying the same to liberate bilirubin.

2. A process for recovering bilirubin from a water-immiscible organic solvent solution containing the same which comprises adding to said solution in the presence of water a weakly basic substance to remove strongly acidic components of said solution, separating off the water-immiscible solvent phase, adding to said phase in the presence of water a stronger base to form bilirubin salt, and separating said bilirubin salt from said resulting solution.

3. A process for purifying impure bilirubin which comprises dissolving the impure bilirubin in a water-immiscible organic solvent, adding thereto a weakly basic substance in the presence of water to remove strongly acidic impurities, separating the water-immiscible solvent phase, adding to said phase a stronger base in the presence of water to form bilirubin salt, recovering the said salt, acidifying the same to liberate bilirubin and recovering said bilirubin.

4. A process as in claim 2, wherein the water-immiscible organic solvent is a liquid chlorinated aromatic hydrocarbon.

5. A process as in claim 3, wherein the water-immiscible organic solvent is a liquid chlorinated aromatic hydrocarbon.

6. A process for recovering bilirubin from solutions thereof in water-immiscible organic solvents which comprises subjecting said solutions to the action of sodium bicarbonate in the presence of water to remove strongly acidic components of said solutions, separating off the water-immiscible solvent phase, subjecting said phase to the action of sodium carbonate in the presence of water to form bilirubin salt, separating the resulting bilirubin salt and acidifying the same in the presence of water to liberate bilirubin, and recovering the bilirubin.

7. In a process for recovering bilirubin from impure mixtures containing the same, the steps of treating said mixtures dissolved in water-immiscible organic solvents, in the presence of water, with a weakly basic substance to remove strongly acidic impurities, separating off the water-immiscible solvent phase and treating said phase in the presence of water with a stronger base capable of forming a bilirubin salt.

8. A process for preparing bilirubin comprising extracting animal bile with a solvent for bilirubin in which the bile acids are not soluble to obtain a solution including bilirubin and impurities, subjecting said solution to the action of a weakly basic substance to separate said impurities therefrom, subjecting the resulting solution to the action of a strong basic substance to separate bilirubin salt, and acidifying said salt to liberate bilirubin.

9. A process as set forth in claim 8 in which said solvent is chlorbenzine.

ROBERT H. SIFFERD.
JULES D. PORSCHE.
FRED J. SOLMS.